United States Patent [19]

Shioya

[11] Patent Number: 5,649,752
[45] Date of Patent: Jul. 22, 1997

[54] PROJECTOR SYSTEM USING TWO LIQUID CRYSTAL PROJECTORS

[75] Inventor: Yukinori Shioya, Tokyo, Japan

[73] Assignee: NEC Corporation, Japan

[21] Appl. No.: 519,431

[22] Filed: Aug. 25, 1995

[30] Foreign Application Priority Data

Aug. 25, 1994 [JP] Japan ................................. 6-200868

[51] Int. Cl.⁶ ............................................... G03B 21/14
[52] U.S. Cl. ................................ 353/94; 353/20; 353/30
[58] Field of Search ............................ 353/20, 30, 8, 353/94; 348/762, 752, 767; 359/40, 63

[56] References Cited

U.S. PATENT DOCUMENTS 3,498,705  3/1970  Ooue et al. ........................... 353/20
5,115,305  5/1992  Baur et al. ............................ 359/40
5,387,991  2/1995  Mitsutake et al. .................... 359/40

FOREIGN PATENT DOCUMENTS 4180053  6/1992  Japan ................................. 353/30
4175744  6/1992  Japan ................................. 353/30
5-66502  3/1993  Japan .

*Primary Examiner*—William Dowling
*Attorney, Agent, or Firm*—Ostrolenk, Faber, Gerb & Soffen, LLP

[57] ABSTRACT

A liquid crystal projector system capable of reducing color variation on a projection screen which may occur when images from two liquid crystal projectors are combined thereon and obtaining a highly even combined image is provided. The two liquid crystal projectors are arranged such that a flat plane containing optical axes of projection lenses of these liquid crystal projectors becomes in parallel to a minor side direction of the projection screen.

2 Claims, 3 Drawing Sheets

PROJECTOR SYSTEM USING TWO LIQUID CRYSTAL PROJECTORS

BACKGROUND OF THE INVENTION

The present invention relates to a projector system and, more particularly, to a projector system using two liquid crystal projectors, which combines images projected by the two liquid crystal projectors.

In a conventional method of improving brightness of a projection screen, a pair of liquid crystal projectors are juxtaposed such that images from these projectors are combined on the screen by adjusting angles and focuses of projection lenses of the projectors. In this method, however, the adjustment must be performed every time when a projecting distance is changed since optical axes of these liquid crystal projectors are not coincident with each other. Further, peripheral portions of the images on the screen are not consistent with each other due to trapesoidal distortion of the images.

In order to solve these problems, Japanese Patent Application Laid-open No. H5-66502 (1993) proposes a liquid crystal projector system. FIG. 4 is a plan view of the proposed liquid crystal projector system. In FIG. 4, the liquid crystal projector system includes a liquid crystal projector 40 having an S polarizing projection lens 41 which emits an S polarized light, and a liquid crystal projector 50 having a P polarizing projection lens 51 which emits a P polarized light. Then, the S and P polarized lights are combined by a polarized light beam splitter 60' and projected onto a projection screen 70'.

In the liquid crystal projector system shown in FIG. 4, the S polarization liquid crystal projector 40 and the P polarization liquid crystal projector 50 are arranged such that a virtual flat plane containing optical axes 42 and 52 of the projection lenses 41 and 51 of the respective S and P polarization liquid crystal projectors 40 and 50 is parallel to a long (major) side direction of the projection screen 70'. Incidentally, the major side direction of the projection screen is a lateral or horizontal direction shown in FIG. 4 by a double arrow.

In this case, an incident angle of light from the lens, for example, lens 51, to a polarized light combining plane 61' of the polarization beam splitter 60' varies substantially in the major side direction of the projection screen. Further, it has been known that spectral characteristics of the polarization beam splitter 60' has an incident angle dependency and is changed with deviation of the light incident angle from 45 degree, as shown in FIG. 3. Therefore, when the light incident angle is deviated from 45 degree, there may be produced an unevenness of image color in the major side direction of the projection screen.

SUMMARY OF THE INVENTION

An object of the present invention is to provide a liquid crystal projector system capable of obtaining a highly uniform image on a projection screen associated therewith by reducing the color variation on the projection screen when images from a pair of liquid crystal projectors are combined thereon.

According to the present invention, there is provided a liquid crystal projector system comprising a pair of liquid crystal projectors for P and S polarization and a polarized beam splitter for combining images from the liquid crystal projectors, wherein the projectors are arranged such that a virtual flat plane containing optical axes of projection lenses of the liquid crystal projectors is in parallel to a short (minor) side direction of a projection screen associated therewith.

Further, in an aspect of the present invention, the liquid crystal projector system is characterized by that the liquid crystal projectors project lights polarized linearly in the minor side direction of the projection screen and a ½ wavelength plate is arranged between the liquid crystal projector for S polarization and the polarized light beam splitter.

Further, in another aspect of the present invention, the liquid crystal projector system is characterized by that the liquid crystal projectors project lights polarized linearly in the minor side direction of the projection screen and a ½ wavelength plate is arranged between the liquid crystal projector for P polarization and the polarized light beam splitter.

In a further aspect of the present invention, the liquid crystal projector system is characterized by that one of the liquid crystal projectors emits a light polarized linearly in a major side direction of the projection screen and the other liquid crystal projector emits a light polarized linearly in the minor side direction of the projection screen.

In any of the above-mentioned construction of the liquid crystal projector system, it is possible to reduce a variation of incident angle of light emitted from each liquid crystal projector to the polarized light beam splitter and thus reduce color variation due to the incident angle dependency of the beam splitter.

DETAILED DESCRIPTION OF THE PREFERRED EMBODIMENTS

An embodiment of a liquid crystal projector device according to the present invention will be described with reference to FIG. 1.

Figure 1:
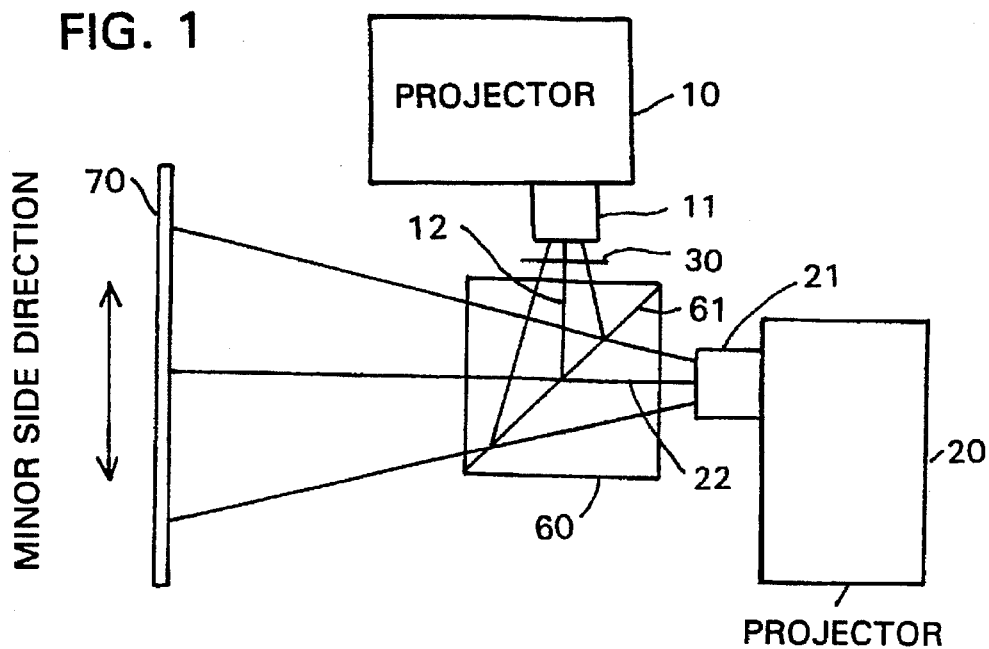
FIG. 1 is a side view showing a construction of a liquid crystal projector system according to an embodiment of the present invention.

In FIG. 1, a first and second liquid crystal projectors 10 and 20 each emitting a light polarized linearly in a minor side direction, that is, a vertical direction, of a projection screen 70 having aspect ratio of 5:4 are used. That is, FIG. 1 is a side view of the liquid crystal projector system and thus the vertical direction in FIG. 1 corresponds to the minor side direction of the projection screen.

The first liquid crystal projector 10 and the second liquid crystal projector 20 are arranged such that optical axes 12 and 22 of projection lenses 11 and 21 of the respective liquid crystal projectors 10 and 20 are orthogonal to each other and a virtual flat plane containing these optical axes 12 and 22 is parallel to the minor side direction of the projection screen. A ½ wavelength plate 30 for rotating the polarizing direction by 90 degree is disposed between the projection lens 11 of the first liquid crystal projector 10 and a polarized light beam splitter 60.

The light polarized linearly in the minor side direction with respect to the projection screen and emitted from the projection lens 21 of the second liquid crystal projector 20 is incident on the polarized light beam splitter 60. Since this linearly polarized light is a P polarized light with respect to a polarized light combining plane 61 of the beam splitter 60, it passes through the polarized light combining plane 61 onto the screen 70. The light emitted from the first liquid crystal projector 10 and polarized linearly in the minor side direction with respect to the projection screen is converted by the ½ wavelength plate 30 into a linearly polarized light in the major side direction, that is, a horizontal direction, and passes to the polarized light beam splitter 60. Since the linearly polarized light in the major side direction with respect to the projection screen is an S polarized light with respect to the polarized light combining plane 61, it is reflected by the polarized light combining plane 61 and projected onto the screen 70.

Figure 2:
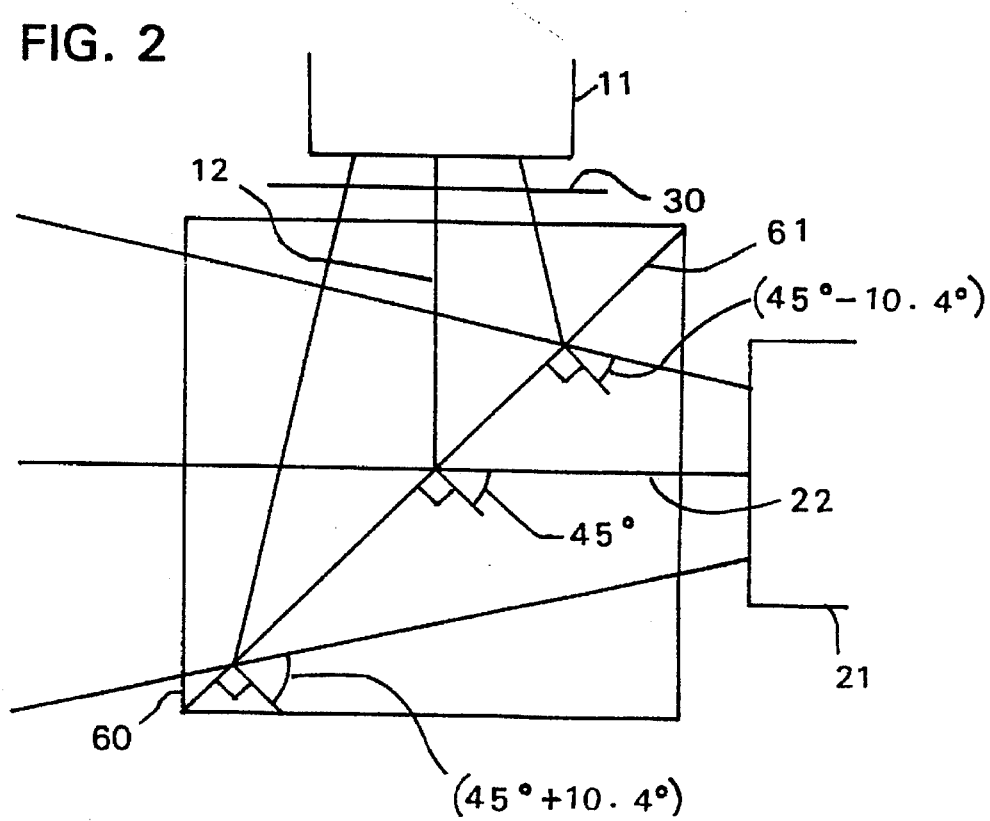
FIG. 2 is an enlarged side view of a polarized light beam splitter of the liquid crystal projector system shown in FIG. 1.
Figure 3:
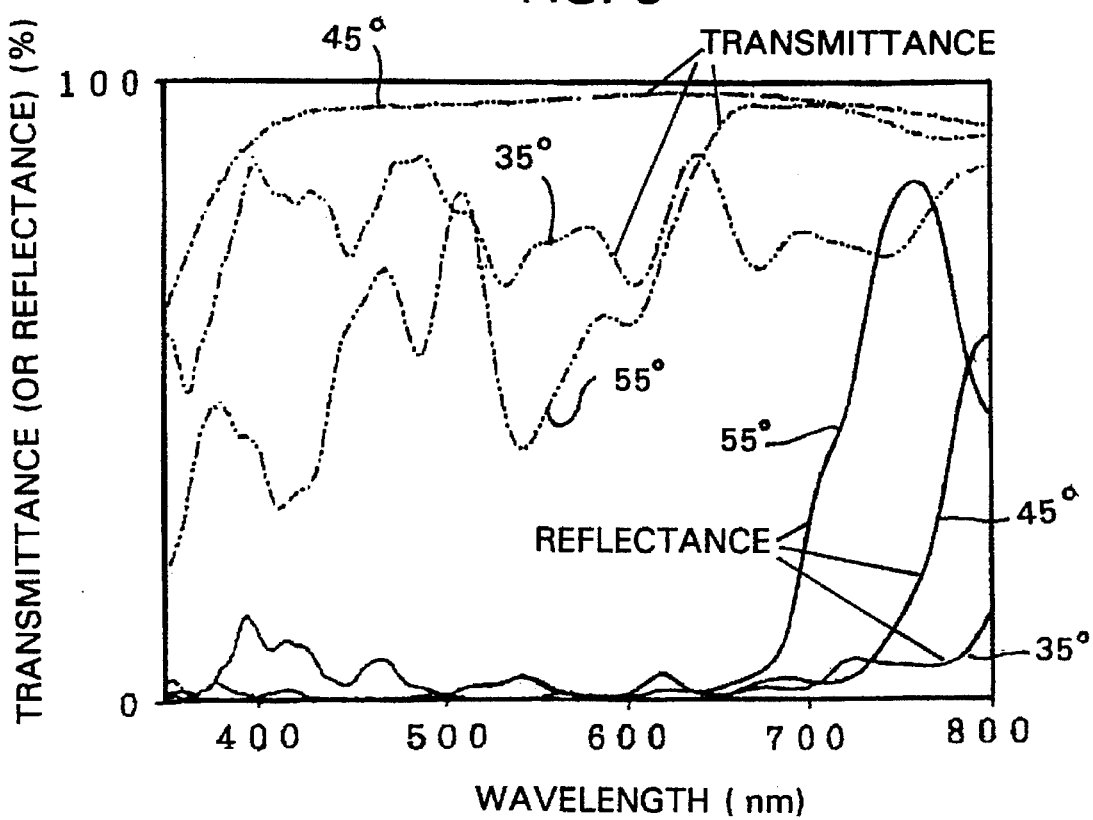
FIG. 3 is a graph showing a spectral characteristics of the polarized light beam splitter.
Figure 4:
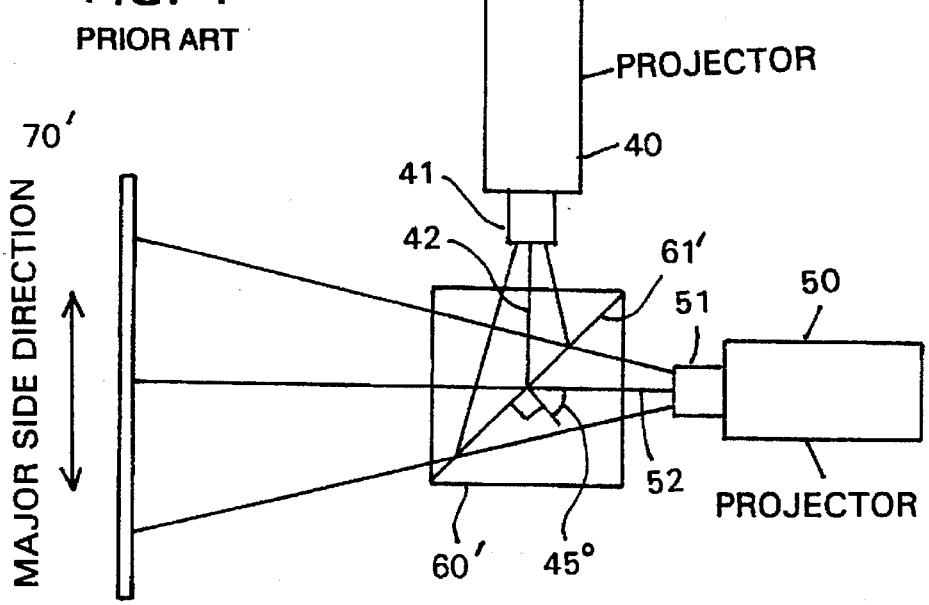
FIG. 4 is a plan view showing a construction of a conventional liquid crystal projector system.

As mentioned above, if the virtual flat plane containing the optical axes 12 and 22 of the projection lenses 11 and 21 of the liquid crystal projectors 10 and 20 be made in parallel to the major side direction of the projection screen, the incident angle to the polarized light combining plane 61 of the polarized light beam splitter 60 becomes about 45°±12.7°. On the other hand, when the virtual flat plane containing the optical axes 12 and 22 of the projection lenses 11 and 21 of the liquid crystal projectors 10 and 20 is in parallel to the minor side direction of the projection screen as in this embodiment, the incident angle to the polarized light combining plane 61 of the polarized light beam splitter 60 becomes about 45°±10.4° as shown in FIG. 2 and so the deviation of incident angle is reduced. Consequently, the influence on the incident angle dependency of the polarized light beam splitter 60 is reduced correspondingly.

It has been found that, according to this embodiment, the color variation over the projection screen can be reduced by about 80% compared with the conventional liquid crystal projector device.

In the embodiment shown in FIG. 1, the liquid crystal projectors 10 and 20 both which project lights polarized in the minor side direction of the projection screen are used. However, according to the present invention, it is possible to use different type liquid crystal projectors which project lights polarized in the major side direction of the projection screen. In such case, the ½ wavelength plate 30 may be disposed between the second liquid crystal projector 20 and the polarized light beam splitter 60. This embodiment is shown in FIG. 5.

Figure 5:
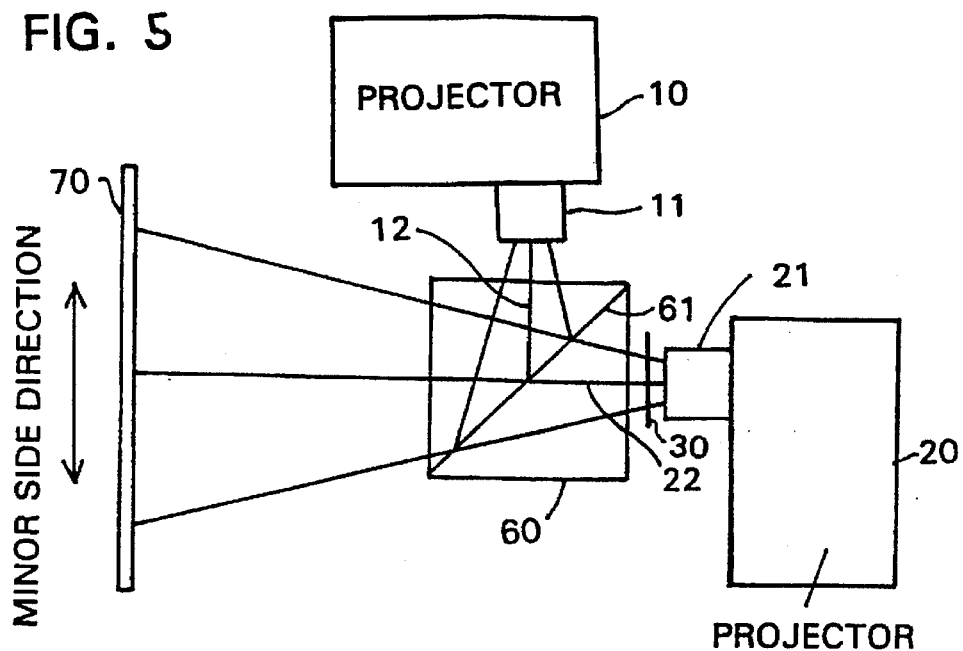
FIG. 5 is a side view showing a construction of a liquid crystal projector system according to a second embodiment of the present invention.
Figure 6:
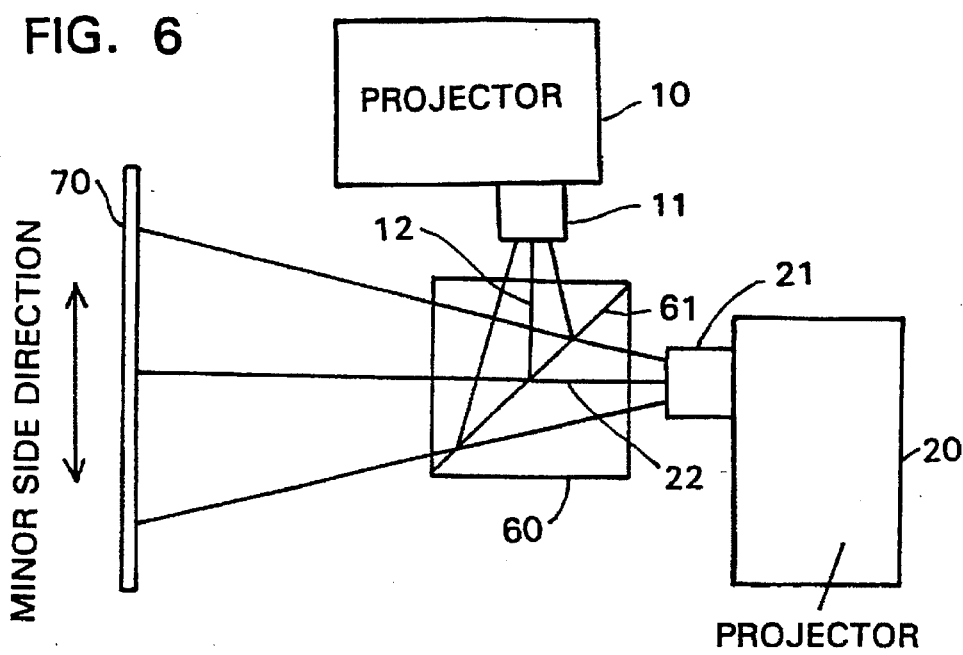
FIG. 6 is a side view showing a construction of a liquid crystal projector system according to a third embodiment of the present invention.

Further, although the first and second liquid crystal projectors in the embodiments shown in FIGS. 1 and 5 emit lights polarized in the same direction, it is also possible to modify them to emit lights polarized differently. For example, the first liquid crystal projector 10' may emit a light linearly polarized in the major side direction of the projection screen and the second liquid crystal projector 20 may emit a light linearly polarized in the minor side direction of the projection screen. In such case, there is no need of using the ½ wavelength plate 30. Such embodiment is shown in FIG. 6.

As described, since, in the present liquid crystal projector system comprising a pair of liquid crystal projectors and a polarized light beam splitter for combining images projected by these liquid crystal projectors, these liquid crystal projectors are arranged such that a virtual flat plane containing optical axes of projection lenses thereof becomes in parallel to the minor side direction of the projection screen, it is possible to reduce the deviation of the incident angle of light beams to the polarized light combining plane of the polarized light beam splitter and so the influence on the incident angle dependency of the polarized light beam splitter is reduced correspondingly, resulting in a highly uniform image on the projection screen.

What is claimed is:

1. A liquid crystal projector system, comprising: a first liquid crystal projector projecting a P polarized light, a second liquid crystal projector projecting an S polarized light and a polarized light beam splitter for combining images projected by said first and second liquid crystal projectors, said first and second liquid crystal projectors are arranged such that a flat plane containing optical axes of projection lenses of said first and second liquid crystal projectors is parallel to a minor side direction of a projection screen associated therewith, and a ½ wavelength plate disposed between said second liquid crystal projector and said polarized light beam splitter and said first and second liquid crystal projectors project lights polarized linearly in the minor side direction of said projection screen, respectively.

2. A liquid crystal projector system, comprising: a first liquid crystal projector projecting a P polarized light, a second liquid crystal projector projecting an S polarized light and a polarized light beam splitter for combining images projected by said first and second liquid crystal projectors, said first and second liquid crystal projectors are arranged such that a flat plane containing optical axes of projection lenses of said first and second liquid crystal projectors is parallel to a minor side direction of a projection screen associated therewith, and a ½ wavelength plate disposed between said first liquid crystal projector and said polarized light beam splitter and said first and second liquid crystal projectors project lights polarized linearly in a major side direction of said projection screen, respectively.

* * * * *